Feb. 21, 1950 G. W. FYLER 2,498,488

TELEVISION INTERCARRIER OR SOUND RECEIVER CIRCUIT

Filed June 14, 1946 2 Sheets-Sheet 1

Inventor:
George W. Fyler,
by Merton D. Morse
His Attorney.

TELEVISION INTERCARRIER OR SOUND RECEIVER CIRCUIT

Filed June 14, 1946 2 Sheets-Sheet 2

Inventor:
George W. Fyler,
by Merton D Morse
His Attorney.

Patented Feb. 21, 1950

2,498,488

UNITED STATES PATENT OFFICE 2,498,488

TELEVISION INTERCARRIER OR SOUND RECEIVER CIRCUIT

George W. Fyler, Lombard, Ill., assignor to General Electric Company, a corporation of New York Application June 14, 1946, Serial No. 676,651

4 Claims. (Cl. 178—5.8)

My invention relates to high frequency circuits of the type employed in television receivers and it has for its primary object to effect certain improvements in television receiver circuits for translating simultaneously a plurality of signals variable over different bands of frequencies.

In the usual television receiver, it is customary to employ two intermediate frequency channels to translate separately the intermediate frequency waves modulated by the video and audio signals. In a conventional television circuit, the channel for the video modulated intermediate frequency wave has a relatively broad band width characteristic. The other channel has a comparatively narrow band width characteristic and is used to translate the audio modulated frequency wave.

Each channel, furthermore, requires separate detectors and subsequent amplifiers for satisfactory reproduction of the modulating signals. In order to provide advantages both in operational characteristics and in design and cost, it is an object of my invention to provide a new and improved television receiver which employs a single intermediate frequency channel for translating both video and audio modulated carrier waves.

It is still another object of my invention to provide a new and improved television receiver circuit in which heterodyning of the video and audio modulated intermediate frequency waves is utilized to produce an additional audio modulated carrier wave for subsequent reproduction of the audio signals.

It is a still further object of my invention to provide a new and improved television receiver circuit which employs a single channel for normally translating both video and audio modulated carrier waves and which is capable of reproducing audio signals therefrom in the absence of a video modulated carrier wave.

One of the features of my invention consists in employing a single wide band channel for translating both video and audio modulated high frequency waves and separating an audio modulated intermediate frequency wave from the video signals subsequent to demodulation of the same and prior to the application of video signals to a picture tube.

In a modification of the circuit of my invention, an auxiliary oscillator is employed to provide a heterodyning oscillation in the absence of a video carrier so that the receiver may be employed for reception of audio signals during such periods.

Figure 1:
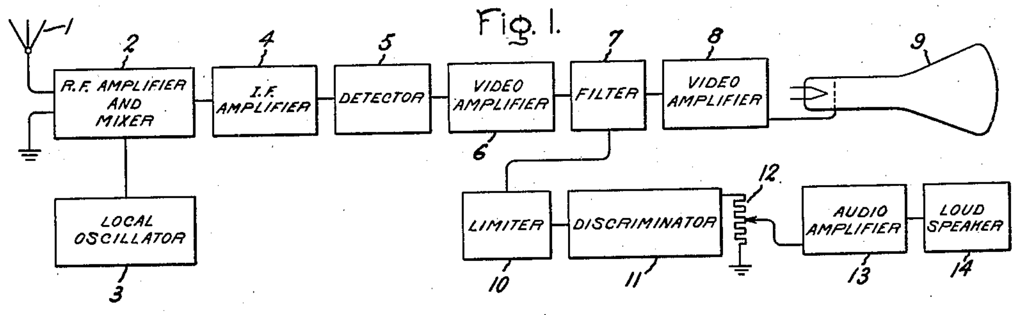
Figure 2:
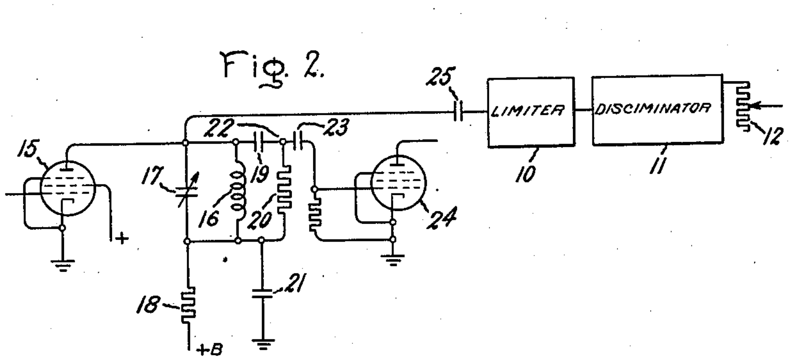
Figure 3:
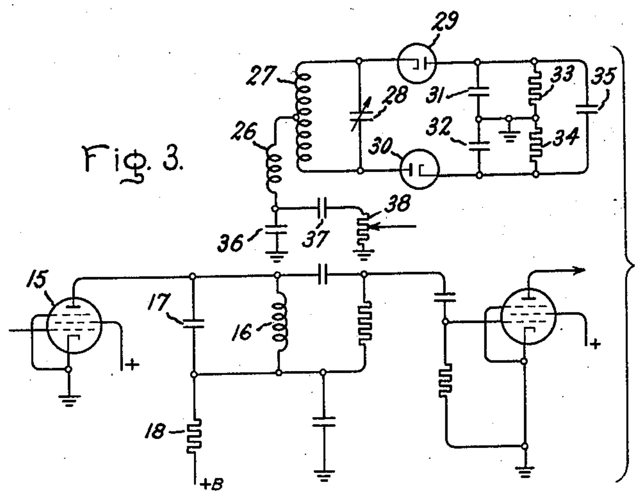
Figure 4:
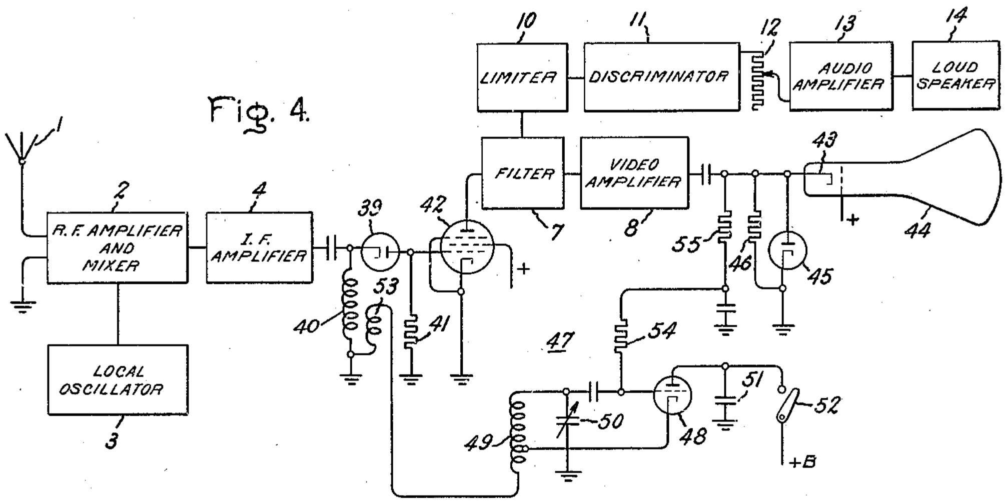
Figure 5:
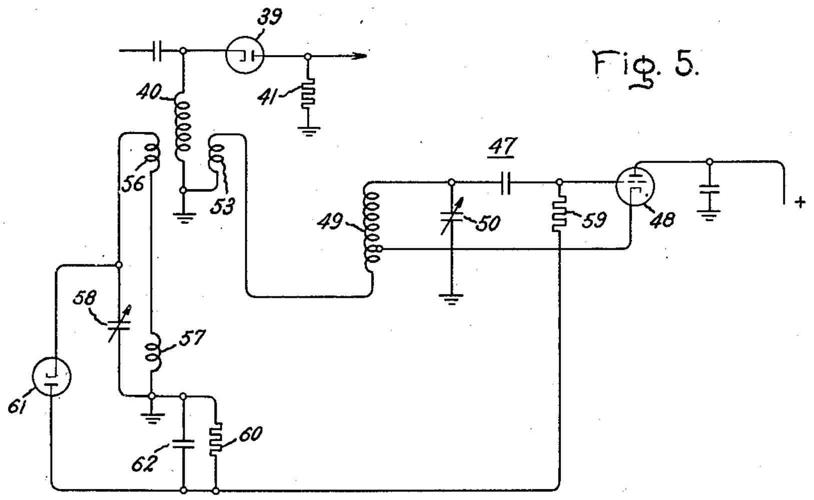

The features of my invention which I believe to be novel are set forth with particularity in the appended claims. My invention itself, however, both as to its organization and method of operation, together with further objects and advantages thereof, may best be understood by reference to the following description taken in connection with the accompanying drawings in which Fig. 1 is a block diagram of a television receiver circuit embodying my invention; Fig. 2 is a detailed circuit diagram of a portion of the receiver circuit of Fig. 1; Fig. 3 is a modification of the portion of the receiver circuit of Fig. 2; and Figs. 4 and 5 are modifications of the receiver circuit of Fig. 1.

It is known that the frequencies of carrier waves employed in the transmission of television signals and of audio signals utilized in conjunction with the television signals are established by Government regulations. The frequencies of the picture carrier waves and of the audio or sound carrier waves are separated in frequency in accordance with such regulations by a frequency of 4.5 megacycles, the audio carrier wave being of a higher frequency than the video carrier wave. Thus, for example, a typical television transmitter may employ a carrier wave for the video signals which has a center frequency of 45.25 megacycles. The same television transmitting station will employ a frequency of 49.75 megacycles as the frequency of the audio carrier wave.

Referring now to Fig. 1 of the drawing, I have there shown an antenna 1 which is adapted for receiving a complete television signal comprising both a video signal modulated carrier wave and an audio signal modulated carrier wave. The antenna 1 supplies the received carrier waves to a first detector circuit 2 where the received carrier waves are combined, as in a usual superheterodyne circuit, with high frequency oscillations provided by a local oscillator 3. The detector circuit 2 may include also circuits for amplifying the received waves prior to mixing or heterodyning with the locally generated oscillations. The output of the circuit 2 is supplied to an intermediate frequency amplifier 4 which may comprise one or more stages of amplification and which has a band pass characteristic of sufficient width that both the video intermediate frequency carrier waves and the audio intermediate frequency carrier waves are amplified and translated by the circuits of the amplifier 4. However, in order not to overmodulate the video carrier and lose contrast range in the received picture, it is desirable that the audio signal be attenuated in the intermediate frequency amplifier prior to detection of the combined signal.

his may be accomplished by reducing the band width of the intermediate frequency circuits or in any other well known manner.

The intermediate frequency carrier waves for the audio and video signals are separated in frequency by 4.5 megacycles subsequent to the mixing action in the circuit 2. The amplified intermediate frequency waves are rectified in a detector 5 to reproduce the video signal from the video modulated intermediate frequency waves. At the same time, due to the curvilinear characteristic of the detector 5, a heterodyning action of the intermediate frequency video modulated carrier waves and the intermediate frequency audio modulated carrier waves is obtained so that at the output of detector 5 there is present an audio modulated carrier wave having a mid band frequency of 4.5 megacycles. This carrier wave is frequency modulated with the desired audio signal.

Both the video signals and the 4.5 megacycle audio modulated carrier wave are amplified in a video amplifier 6 and supplied to a filter 7 where the 4.5 megacycle wave is separated from the video signals. Preferably, the filter 7 is of the infinite attenuating type so that only video signals are supplied to a second video amplifier 8 and utlimately to the control electrode of a picture tube 9. The 4.5 megacycle audio modulated intermediate frequency wave which is rejected by the filter 7 is supplied to an amplitude limiter 10. The limited waves are detected in the slope filter or balanced frequency discriminator 11 to reproduce the audio signals in the usual manner. These audio signals are supplied through a volume control potentiometer 12 to an audio amplifier 13 and ultimately to a loudspeaker 14.

In the circuit of Fig. 1 the circuit for reproduction of the audio signals from audio modulated intermediate frequency waves may be conventional in form and constitutes no part of the present invention. Likewise, the picture tube 9 may employ the usual voltage supply, as well as the usual scanning circuits (not shown) which are customarily used in conjunction with the picture tube of a television receiver.

In Fig. 2, I have shown one circuit arrangement by which the audio intermediate frequency carrier wave of 4.5 megacycles is removed from the video signal translating circuits. In this circuit, the electron discharge device 15 may be a video amplifier having an anode circuit which includes a resonant circuit comprising inductance 16 and variable capacitance 17 tuned to a frequency of 4.5 megacycles. Anode potentials for the device 15 are supplied through the tuned circuit and a resistance 18 from a conventional source indicated by the legend B+. Connected across the inductance is a series circuit comprising a capacitance 19 and a resistance 20. The common terminal of resistance 20 and inductance 16 is connected to ground through a capacitance 21. If the values of the capacitance 17 and the inductance 16 are such that they resonate at or near the frequency which it is desired to attenuate infinitely, that is, 4.5 megacycles, and if the values of resistance 20 and capacitance 21 are properly adjusted, the currents of the frequency which it is desired to attenuate and which flow through resistance 20 to the terminal 22 are equal and opposite to currents of this frequency which flow through capacitance 19 to this terminal. In order to obtain such opposition of the currents which flow through resistor 20 and capacitance 19, it has been found that resistance 20 must have a relatively large value compared with the reactive impedance of capacitor 21 at the frequency to be attenuated. By proper choice of the constants, the characteristic of the video circuits may also be made substantially flat, up to about 3.5 megacycles.

With the foregoing connection and with proper values of the circuit components, waves of the frequency of the audio modulated intermediate frequency waves are infinitely attenuated by the circuit elements 16, 17, 19—21. As a consequence, video signals alone are supplied through a coupling capacitor 23 to the input electrode of a video amplifier 24. On the other hand, the audio modulated intermediate frequency carrier waves may be supplied through a coupling capacitor 25 to the amplitude limiter 10. Some form of amplitude limiting is important to eliminate cross modulation of the audio by the video signal.

In Fig. 3 I have shown a modification of my television receiver circuit in which the amplitude limiter of the circuits of Figs. 1 and 2 is eliminated. In this circuit, there is employed a ratio detector to reproduce the audio signals from the audio modulated intermediate frequency waves. This ratio detector comprises a small winding 26 which is tightly coupled to the tuned primary winding 16. The winding 26 is connected to the mid point of a secondary winding 27 to supply primary voltage in series with the two halves of the secondary winding. The secondary winding is tuned by means of variable capacitor 28. The opposite ends of the winding 27 are connected to reversed diodes. The upper end of the winding 27 is connected to the cathode of the diode 29, while the lower end of the winding 27 is connected to the anode of the diode 30. The anode of the diode 29 and the cathode of the diode 30 are connected together through three parallel branches which comprise respectively serially connected capacitors 31, 32, serially connected resistors 33, 34, and a large capacitor 35. Such a ratio detector is found to be substantially irresponsive to amplitude variations in a received wave and to provide across the resistors 33, 34 respectively voltages which are in the ratio of the voltage in coil 26 and the upper half of secondary winding 27 to that in coil 26 and the lower half of winding 27. The opposite end of the winding 26 is connected to ground through a capacitor 36. Audio signals are coupled from the junction of coil 26 and capacitor 36 through a coupling capacitor 37 to a volume control 38.

In the circuit of Fig. 4 I provide an arrangement by which the television receiver circuits are available for the reception of frequency modulated audio signals even when a video carrier wave is not received. Such conditions occur often in stand-by periods of a television transmitter station or in other periods when a video transmitter is not operating and it is desirable that audio signals may still be transmitted. Certain portions of this circuit are identical with the circuit of Fig. 1 and have been identified with corresponding reference numerals. The intermediate frequency signals at the output of the intermediate frequency amplifier are supplied to the cathode of a diode detector 39. The cathode of detector 39 is connected to ground through a winding 40 of a coupling transformer. The anode of diode 39 is connected to ground through a load resistance 41 and to the control electrode of a video amplifier 42. The output of the video amplifier 42 is supplied to the filter 7 where the audio signals are removed and supplied through the limiter 10 to discriminator 11, volume control 12, an audio amplifier 13, and a loudspeaker 14. The video signals are further amplified in the video amplifier 8 and coupled to the cathode 43 of a picture tube 44. A D. C. restorer circuit is connected between the cathode 43 and ground and comprises a diode rectifier 45 and a load resistance 46.

In order that the television circuits are operative to receive signal modulated carrier waves in the absence of a video carrier wave, I provide an auxiliary oscillator 47 which injects an oscillation of the frequency of the video carrier into the circuit of the detector 39. The oscillator 47 comprises an electron discharge device 48 having its cathode connected to a tap on inductance 49 and its control electrode coupled to the upper terminal of the inductance 49. The inductance 49 is resonated to the frequency of the carrier wave by means of a tuning condenser 50. The anode of the device 48 is connected to ground through a capacitor 51 for alternating currents and supplied with operating potential from any suitable source labelled B+ through a switch 52. The current in inductance 49 flows through a winding 53 which is coupled to the winding 40 in the circuit of detector 39.

The oscillator 47 is normally rendered inoperative during television reception by a negative bias which is supplied to the control electrode of the device 48 through a resistance 54 and obtained by connection through a resistance 55 across the D. C. restorer circuit of the tube 44. Thus, when the video carrier is not being received, the upper terminal of resistance 46 is substantially at ground potential because the frequency modulated audio signal at 4.5 megacycles has a low amplitude at the picture tube grid due to the use of 4.5 megacycle rejection circuits. However, when video signal is being received, this terminal is at negative potential with respect to ground and this negative potential is applied to the control electrode of electron discharge device 48. As previously stated, the inductance 49 and capacitance 50 are resonated at the frequency of the video intermediate frequency carrier wave to provide in the circuit of the diode 39, in the absence of a received video carrier wave, an oscillation which is heterodyned with the received audio carrier wave. As a result, a 4.5 megacycle intermediate frequency carrier wave frequency modulated with the received audio signals is present in the anode circuit of diode 39 and utilized to operate the loudspeaker 14.

The operation of the oscillator 47 may also be controlled by means of the switch 52. Thus, if it is desired not to supply a biasing potential to the grid of the device 48 from a D. C. restorer circuit, the oscillator may be normally disconnected by means of the switch 52 and allowed to operate only when a video carrier wave is not being received.

In Fig. 5 I have shown a modification of the circuit of Fig. 4 in which an additional coil 56 is coupled to the inductance 40. Coil 56, which is in series with an inductance 57, is resonated by a capacitance 58 at the frequency of the video intermediate frequency carrier wave. The control electrode of electron discharge device 48 is connected to ground through resistances 59 and 60. The resistance 60 likewise functions as the load resistance of a rectifier 61 illustrated as a diode connected across the tuned circuit 57, 58. The resistance 60 is bypassed by capacitor 62 for high frequency waves. In this circuit, when a video carrier wave is not received, the oscillator 47 provides an oscillation of the frequency of the video intermediate frequency carrier wave to the coil 40. However, when a video carrier wave is being received, the video intermediate frequency wave is coupled into the coil 56. The waves developed in the tuned circuit 56, 57, 58 are rectified by the diode 61 to develop across resistance 60 a negative potential which is applied through resistance 59 to the control electrode of discharge device 48 to interrupt operation of the oscillator 47. In this manner, the oscillator 47 normally, in the absence of a carrier wave, provides a wave to the diode 39 which is mixed with an audio intermediate frequency wave to provide a 4.5-megacycle audio modulated intermediate frequency wave. However, when the video carrier is received and is above a predetermined level, the diode 61 rectifies currents of this frequency to provide a bias which interrupts operation of the auxiliary oscillator.

An important advantage of my improved audio system for television receivers is that it assures tuning of the audio together with the video signals and that the audio circuits remain tuned throughout the reception of a television program. In this way, the constant retuning of the audio circuit which has been required in previous television receivers is avoided. Furthermore, I have found that with my improved system, requirements as to the local oscillator stability are less rigorous than heretofore required for satisfactory operation of the audio circuit of a television receiver. Thus, in a receiver employing my improved circuit, I have found that the local oscillator may be detuned to a considerable extent without adversely affecting the quality of the sound reproduced by the speaker of the receiver.

Another important advantage of my improved television receiver system is that it permits reception of audio signals even when a video carrier wave is not being received. Thus, by providing a wave of the frequency of the intermediate frequency video wave, the intermediate frequency audio wave may be mixed therewith to permit operation during such periods. At the same time, the adjustable local oscillator 3 permits tuning over a wide range of signals, the frequency of the auxiliary oscillator being the same for any of the selected stations.

A further advantage of my improved television receiver circuit is that it reduces greatly the number of tubes required in a receiver and, hence, the overall cost of the receiver. At the same time, improved overall operation of the receiver is obtained.

While I have shown and described particular embodiments of my invention, it will occur to those skilled in the art that many changes and modifications may be made without departing from my invention and I, therefore, aim in the appended claims to cover all such changes and modifications as fall within the true spirit and scope of my invention.

What I claim as new and desire to secure by Letters Patent of the United States is:

1. In a television receiver, means to receive a picture modulated carrier wave and an audio frequency modulated wave, said carrier waves being separated in frequency by a constant difference frequency, means for converting both of said waves to waves of different frequency, a single channel connected to translate both of said converted waves, means for mixing said converted waves to provide an audio frequency modulated carrier wave of a frequency equal to the difference between the frequencies of said converted waves, means coupled to said channel and operative in the absence of a received picture carrier wave to supply to said channel waves of the frequency of said converted picture carrier waves, whereby audio frequency waves may be received during the absence of a picture carrier wave, and means for rendering said last means inoperative when a picture carrier wave is received.

2. In a television receiver, means to receive a picture modulated carrier wave and an audio frequency modulated carrier wave, said carrier waves being separated in frequency by a constant difference frequency, means for converting both said carrier waves to waves of different frequency, a single channel connected to translate both of said converted waves, means for mixing said converted waves to provide an audio frequency modulated wave of a frequency equal to said difference frequency, an oscillator arranged to provide an output wave, means for supplying said output wave to said mixing means, said output wave being separated in frequency from a received audio frequency modulated wave by said difference frequency, and means for controlling said oscillator to supply said output wave to said mixing means only during periods when said single channel does not translate a converted picture modulated wave.

3. In a television receiver, means to receive a picture modulated carrier wave and an audio frequency modulated carrier wave, said carrier waves being separated in frequency by a constant difference frequency, means for converting both said carrier waves to waves of different frequency, a single channel connected to translate both of said converted waves, means for mixing said converted waves to provide an audio frequency modulated wave of a frequency equal to said difference frequency, oscillator means for supplying an output wave to said mixing means, said output wave being separated in frequency from a received audio frequency modulated wave by said difference frequency, and means for disabling said oscillator means during periods of reception of a picture modulated carrier wave.

4. In a television receiver, means to receive a picture modulated carrier wave and an audio frequency modulated carrier wave, said carrier waves being separated in frequency by a constant difference frequency, means for converting both said carrier waves to waves of different frequency, a single channel connected to translate both of said converted waves, means for mixing said converted waves to provide an audio frequency modulated wave of a frequency equal to said difference frequency, an oscillator arranged to supply an output wave to said mixing means, said output wave being separated in frequency from a received audio frequency modulated wave by said difference frequency, and means for energizing said oscillator only during periods when said single channel does not translate a converted picture modulated wave.

GEORGE W. FYLER.

REFERENCES CITED

The following references are of record in the file of this patent:

UNITED STATES PATENTS

| Number | Name | Date |
|---|---|---|
| 1,495,470 | Farrington | May 27, 1924 |
| 1,681,564 | Wright | Aug. 21, 1928 |
| 1,735,134 | Schroter | Nov. 12, 1929 |
| 1,797,317 | Brand | Mar. 24, 1931 |
| 2,056,607 | Holmes | Oct. 6, 1936 |
| 2,186,455 | Goldmark | Jan. 9, 1940 |
| 2,403,957 | Seeley | July 16, 1946 |
| 2,448,908 | Parker | Sept. 7, 1948 |

OTHER REFERENCES

Proceedings I. R. E. (page 56), February 1946.